United States Patent [19]

Ferguson

[11] 4,351,403
[45] Sep. 28, 1982

[54] WEIGHING SCALES INCORPORATING PRINTERS

[75] Inventor: Andrew C. Ferguson, Sutton Coldfield, England

[73] Assignee: W. & T. Avery Limited, West Midlands, England

[21] Appl. No.: 242,037

[22] Filed: Mar. 9, 1981

[51] Int. Cl.³ .................. G01G 23/38; G01G 23/18
[52] U.S. Cl. ........................................ 177/2; 177/128
[58] Field of Search ............................... 177/2-13; 177/25, 128, DIG. 3

[56] References Cited

U.S. PATENT DOCUMENTS 4,036,316  7/1977  Rock ............................ 177/25 X
4,274,500  6/1981  Kuhnle ...................... 177/DIG. 3

Primary Examiner—George H. Miller, Jr.
Attorney, Agent, or Firm—C. O. Marshall, Jr.

[57] ABSTRACT

A price computing weighing scale has a platform 10 and a m in housing 14 and also incorporates a printer unit 16 located between the platform 10 and the main housing 14 so as to be removable as a unit whereby the scale can be supplied with or without a printing facility. Location of the printer unit 16 within the area beneath the platform 10 minimises the counter space occupied by the weighing scale and printer.

8 Claims, 5 Drawing Figures

WEIGHING SCALES INCORPORATING PRINTERS

This invention relates to a weighing scale having a facility for providing a printed record of each weighing effected.

There is an increasing demand from retail businesses for a printed record to be provided for each weighing. Hitherto this demand has been met either by providing a "stand alone" printing unit separate from the weighing scale but linked thereto by an electrical signal transmission cable or by incorporating the printer in the weighing scale. With the exception of the weighing scale mentioned below, as far as we are aware in all examples of weighing scales with built-in printers, the printer unit is located along side the weighing unit and such scales, and also those with separate printers, suffer from the drawback that the counter space required is increased because of the presence of the printing unit, the ticket capacity is very limited (the printing unit being kept small to avoid taking up excessive counter space) and the need for access to the interior of the printing unit to replenish the ticket supply and ink makes the sealing of the unit against ingress of foreign matter difficult. U.S. Pat. No. 3,461,984 shows a typical prior art arrangement combining a weighing scale and a printer.

The exception referred to above is the scale disclosed in U.S. Pat. No. 2,549,752 which employs a mechanical drum computing mechanism operated by the scale pan. The drums in this case have a dual purpose in that they are provided with printing type so that a print-out can be derived. This type of mechanism suffers from the drawback that the large displacements of the scale pan inevitably make it very difficult to prevent the ingress of foreign matter while at the same time providing ready access to the printer, and the scale cannot be readily converted to one without a printing facility as the printing mechanism is inextricably linked with the weighing mechanism. Moreover, the printing medium feed mechanism has to be located at the base of the scale and is relatively difficult to maintain. As a result of the location of the feed mechanism, the printed labels issue adjacent the base of the housing at one side thereof and in general this will be inconvenient to the user as a space must then be kept clear in that region to allow the printed labels to be collected.

The present invention seeks to provide an improved weighing scale with a built in printing facility which overcomes the above drawbacks.

According to the present invention we provide a weighing scale including printing means, characterised in that the load receiving member or platform of the scale is mounted on a load cell for providing an electrical representation of the applied load and at least part of the, and preferably the entire, printing means is located within an area directly beneath the load receiving platform.

With a load cell mounting for the platform, the degree of movement of the platform even for loads at the top end of its capacity is very small and the presence of the printer beneath the platform does not therefore create any difficulties as far as platform movement is concerned.

In the preferred embodiment, the printing means comprises a printing device, means for storing a supply of printing medium (e.g. a supply of tickets or fan folded paper) and means for feeding the printing medium through the printing device whereby the result of each weighing transaction may be recorded, and all of the above mentioned integers of the printing means are housed beneath the load receiving platform on a deck within an area which does not extend beyond the perimeter of said platform, the deck and the printing means being removable as a unit from the scale so that the scale can be used with or without a printing facility.

The platform is conveniently mounted on the load cell by one or more generally vertically extending members so as to be spaced above the main housing of the scale and the printer is accommodated within the space between the main housing and the platform.

Embodiments of the invention are shown in the accompanying drawings to which reference is now made. In the drawings.

Figure 1:
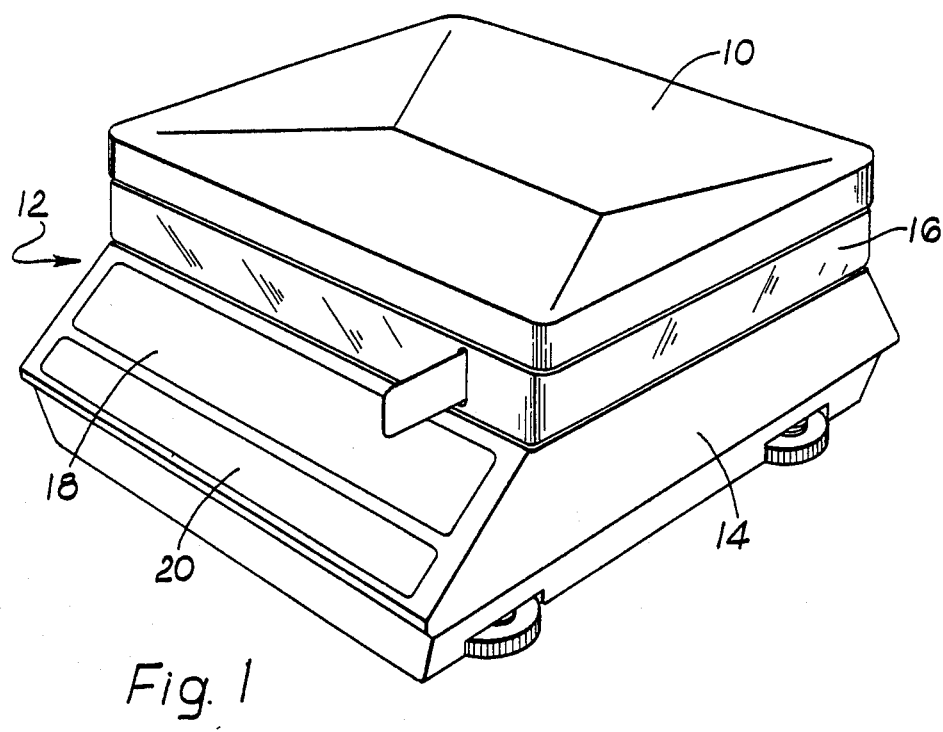
FIG. 1 is a perspective view of a weighing scale in accordance with the invention.

Referring to FIG. 1, the weighing scale according to the present invention comprises a weighing platform 10 mounted on vertically extending rods 11 above the scale housing 12. The scale housing 12 comprises a lower section 14 and an upper section 16. The lower housing section 14 houses for example a bending beam type load cell (not shown) to which the rods 11 are connected, the beam being provided with strain gauges which are wired in for example a Wheatstone bridge configuration so as to provide an output signal representing the applied load. The section 14 also houses circuitry associated with the load cell, circuitry associated with the visual display 18 for displaying weight and also for example price per unit weight and total cost, and circuitry for computing total price etc. A keyboard 20 (the individual keys of which are not illustrated) is provided by means of which the user can key in price per unit weight information and other data.

Figure 2:
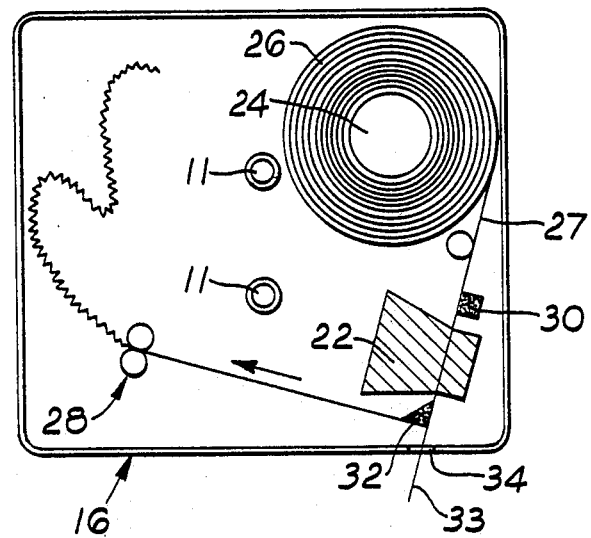
FIG. 2 is a plan view showing the printing deck of the scale in FIG. 1.

The upper section 16 is in the form of an inverted tray shaped cover which may be of transparent or translucent plastics material and accommodates a printing unit. As shown in FIG. 2, in one form the printer comprises a printing head 22, a spool 24 for mounting a roll 26 of adhesive labels carried by a continuous packing strip 27 of for example silicone paper, and a drive and pinch wheel system 28 which is operable in stepwise manner to draw the strip 27 from the roll 26 and thereby increment the labels one by one through the printing head 22. The drive motor and associated control circuitry for the pinch wheel system 28 may be housed within the lower section 14 and the printing head 22 may be supplied with control signals from the electronic circuitry representing the weight and price data and other information to be printed out. A sensor 30 is provided in order to ensure proper registration of the labels with the printing head.

The strip feed path conveniently includes a sharp bend as defined by a guide 32 so that the backing strip is caused to pull away from the labels 33 and leave the latter projecting in the direction of the original path of movement. By providing an opening 34 in the cover 16 adjacent the guide 32, the label can be caused to project externally for collection by the scale user.

Figure 3:
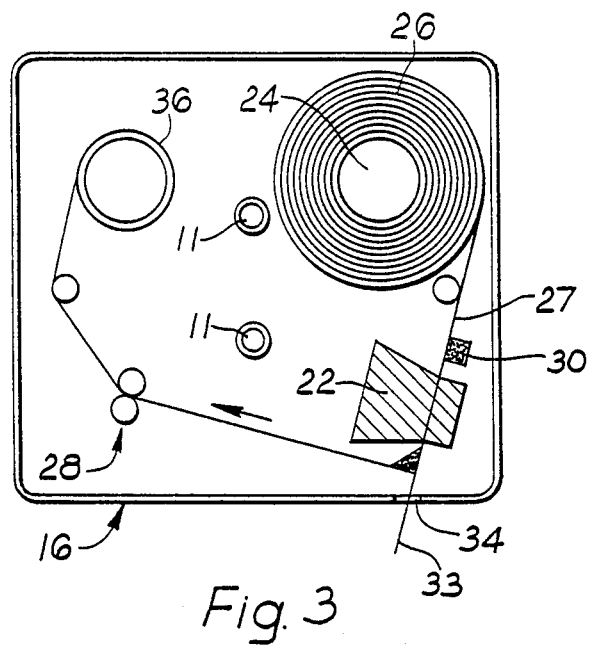
FIG. 3 is a plan view of a modified form of printing deck.

FIG. 3 shows a modified embodiment which is similar to that of FIG. 2 except that the spent backing strip is rewound into roll form by means of a rewinder mechanism 36.

In both embodiments, the cover 16 is formed with a pair of holes through which extend the vertical rods 11 connecting the scale pan to the load cell. The pan itself may seat on a X-shaped structure (not shown) which is supported on the rods and this structure and the cover 16 may include raised formations surrounding the rods 11 which formations nest with each other to prevent ingress of water and such like. The lower edge of the cover 16 may be on the lower housing section 14 via a labyrinth seal to prevent ingress of foreign matter whilst allowing ready removal of the cover 16. Access to the printing mechanism may be obtained by lifting off the weighing pan and supporting structure and the cover 16 and the arrangement may be such that this can be effected in a single operation. Also the printing deck is conveniently removably mounted on the housing section 14 by releasable fasteners to enable the deck and section 16 to be removed when a printing facility is not required. The rods 11 may for this purpose include spacers (not shown) which may also be removed in this event to lower the scale pan.

The printer may be adapted to handle "fan-folded" paper or modified to provide a tally roll record of weighing transactions.

Figure 4:
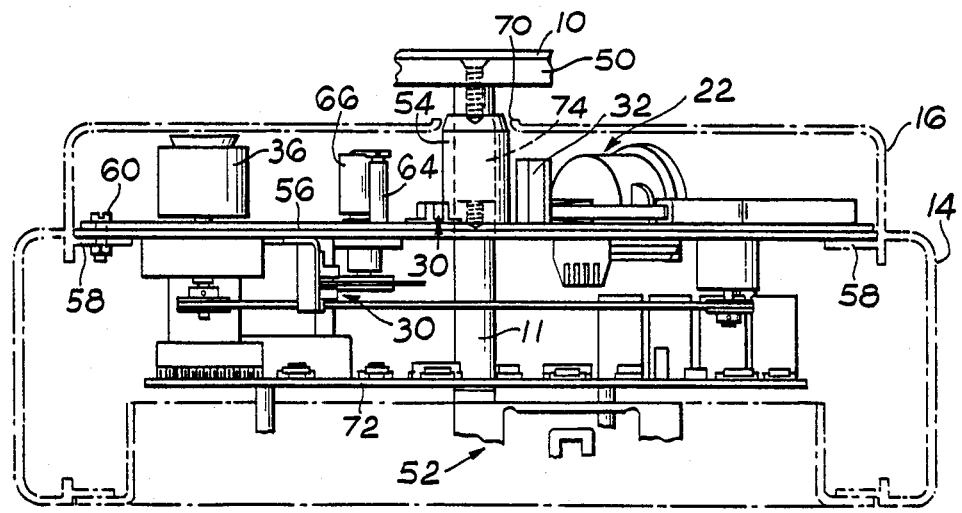
FIG. 4 is a front view of another modified form of printer deck.
Figure 5:
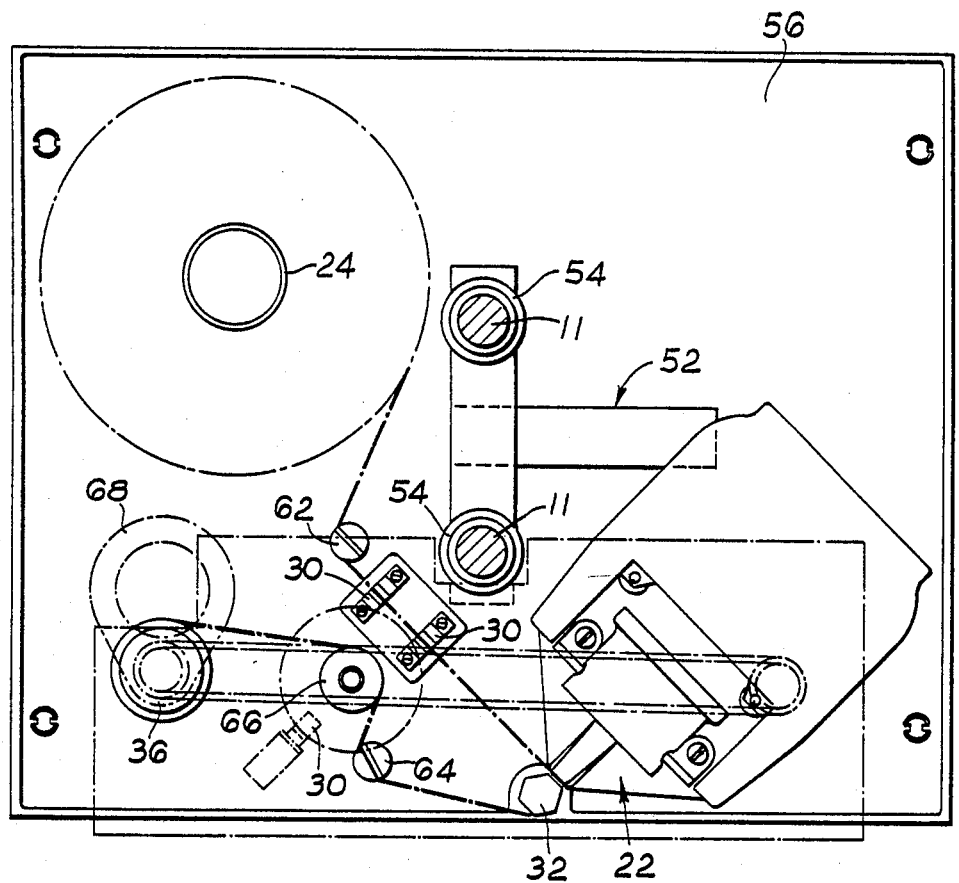
FIG. 5 is a plan view of the deck shown in FIG. 4.

Referring now to FIGS. 4 and 5 the same reference numerals are used in these figures to identify those components which are equivalent to the components shown in FIGS. 2 and 3. The scale pan 10 is mounted on an X-shaped structure 50, part only of which is illustrated, and the structure 50 is supported from a load cell 52 via rods 11. Various forms of load cell may be employed but in FIG. 4 a load cell of the type disclosed in our prior European published patent application No. 15337 is shown (in part only). The rods 11 pass through a pair of guide sleeves 54 on the printer deck 56 and extend into the housing 14 which accommodates the load cell 52. The deck 56 is removably mounted on the housing 14 and for this purpose is supported at its periphery by a flange 58 extending around the edge of a top opening in the housing 14. Fasteners 60 secure the deck 56 to the housing 14.

The deck 56 mounts various components of the label carrying strip feed and printing assembly including a dot matrix printer 22, storage spool 24, take up spool 36, sensors 30 for sensing registry of the labels with the printer 22, guides 32, 62, 64 and 66 and a drive motor 68 for driving the take-up spool and the ribbon feed mechanism of the printer 22. The guides 32 and 66 are rotatable about their axes and the guides 64 and 66 may include rotatable sleeves for contacting the strip. The guide 32 it will be observed is polygonally shaped so as to assist in deflecting the printed labels away from the backing strip in the manner described in the previous embodiments whereby the printed label is projected through an opening in the cover 16 for collection by the operator.

The sensors 30 as mentioned enable the label carrying strip to be coordinated with the printer so that the relevant printed matter is entered at the desired location on the labels. The guide 32 as well as serving to peel the labels from the backing strip also forms an anvil for supporting the labels during printing.

The cover 16 may simply rest on the housing section 14 in the manner indicated in FIG. 4 and is provided with opening 70 through which the bushes 54 and rods 11 extend. The cover 16 may be composed of transparent plastics material so as to aid inspection of the amount of label carrying strip stored. The circuitry associated with the printer and strip feeding assembly and the load cell, keyboard etc. is mounted on a printed circuit board 72 which is fastened within the housing 14 and the arrangement is such that the connections between the circuitry and the electrical components (e.g. the drive motor and sensors 30) of the printer and strip feed assembly are readily disconnectable, e.g. via a single male and female connector.

The rods 11 include detachable extension pieces 74 to which the structure 50 is releasably connected so that, in circumstances to be discussed below, the structure can be secured to the rods 11 without the interposition of the extension pieces. In some circumstances, the end user of the weighing scale may not require a printing facility. To enable the scale to be adapted to meet this requirement, in each embodiment described above the printer and feed assembly together with the cover 16 are designed so as to be readily removable from the housing 14. Thus, with reference to the embodiment of FIGS. 4 and 5, the printer and feed assembly on the housing 16 can be removed simply by removing the pan 10 and structure 50, removing the cover 16, releasing the fasteners 60, lifting out the printing deck 56 and disconnecting the previously mentioned male/female connector. The pan 10 can then be lowered with respect to the housing 14 simply by removing the extension pieces 74 and fastening the structure 50 directly to the upper ends of the rods 11. In this event, the printer and strip feed control circuitry on the board 72 will be redundant but nevertheless will be available if the end user wishes to take advantage of the printing facilities subsequently. Alternatively, the printer and strip feed control circuitry may be provided on a separate board attached to the printer deck 56 so as to be removable with the deck and, in this case, a male/female connector may be provided to interconnect the two circuit boards for the supply of electrical power and data to be printed out.

I claim:

1. A weighing scale including printing means characterised in that the load receiving platform of the scale is mounted on a load cell for providing an electrical representation of the applied load, the scale includes a main housing accommodating the load cell, and said printing means is accommodated within a space between said platform and said housing, directly beneath said platform.

2. A scale as claimed in claim 1 characterised in that the printing means is mounted on said housing so as to be removable as a unit from the housing.

3. A scale as claimed in claim 1 characterised in that said platform is disconnectable from its coupling with the load cell in order to provide access to the printing means.

4. A scale as claimed in claim 3 characterised in that the printing means is accommodated within a cover which seats on the main housing.

5. A scale as claimed in claim 5 characterised in that said cover is transparent.

6. A scale as claimed in claim 1 characterised in that said platform is coupled to the load cell by means of at least one coupling member, the printing means is carried by a base which is releasably connected to the main housing of the scale directly beneath the platform and said at least one coupling member extends through said base and into the main housing which accommodates the load cell.

7. A scale as claimed in claim 6 characterised in that the coupling member includes a removable extension piece which serves to space the platform above the main housing to afford a gap in which the printing means is accommodated.

8. A scale as claimed in claim 7 characterised in that electronic circuitry for controlling the printer including printing medium feed mechanism thereof is located in the main housing and is connected by releasable connector means to the electrical components of said printing means.

* * * * *